US008804275B1

(12) United States Patent
Mate

(10) Patent No.: US 8,804,275 B1
(45) Date of Patent: Aug. 12, 2014

(54) SYSTEM AND METHOD FOR DETERMINING HEAD-DISK CONTACT IN A MAGNETIC RECORDING DISK DRIVE HAVING A FLY-HEIGHT ACTUATOR

(71) Applicant: HGST Netherlands B.V., Amsterdam (NL)

(72) Inventor: Charles Mathew Mate, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/219,986

(22) Filed: Mar. 19, 2014

(51) Int. Cl.
*G11B 21/02* (2006.01)

(52) U.S. Cl.
USPC .............................................. 360/75; 360/31

(58) Field of Classification Search
USPC ........ 360/55, 75, 31, 25, 77.08, 77.05, 235.4, 360/135, 128, 236.5, 235.3, 234.7, 294.7
See application file for complete search history.

(56) References Cited

U.S. PATENT DOCUMENTS

| | | | | |
|---|---|---|---|---|
| 5,021,906 A | * | 6/1991 | Chang et al. | 360/235.1 |
| 5,276,573 A | * | 1/1994 | Harada et al. | 360/235.3 |
| 5,991,113 A | * | 11/1999 | Meyer et al. | 360/75 |
| 6,344,949 B1 | * | 2/2002 | Albrecht et al. | 360/236.5 |
| 6,563,673 B2 | | 5/2003 | Mundt et al. | |
| 6,611,399 B1 | * | 8/2003 | Mei et al. | 360/234.7 |
| 6,775,103 B2 | * | 8/2004 | Kang et al. | 360/236.5 |
| 7,095,587 B2 | * | 8/2006 | Kurita et al. | 360/128 |
| 7,180,692 B1 | | 2/2007 | Che et al. | |
| 7,215,495 B1 | | 5/2007 | Che et al. | |
| 7,375,914 B1 | | 5/2008 | Dieron et al. | |
| 8,335,053 B2 | | 12/2012 | Chen et al. | |
| 8,618,793 B2 | | 12/2013 | Duan et al. | |
| 8,654,466 B1 | * | 2/2014 | McFadyen | 360/31 |

* cited by examiner

*Primary Examiner* — Ali Neyzari
(74) *Attorney, Agent, or Firm* — Thomas R. Berthold

(57) ABSTRACT

In a magnetic recording disk drive, a disk with equally angularly spaced regions that have topography different from the other regions of the disk is used to detect head-disk contact. In one embodiment of a bit-patterned media (BPM) disk, equally angularly spaced servo sectors have topography different from the data regions of the disk. A head-disk spacing sensor detects the topography of the servo sectors as the servo sectors pass the sensor during rotation of the disk. This results in the head-disk spacing sensor generating an output signal with a fundamental frequency $f_0 = NX/60$ Hz, where N is the number of servo sectors and X is the disk rotation rate in RPM. A second or higher harmonic or harmonics of the fundamental frequency $f_0$ are filtered from the output of the head-disk spacing sensor and used to identify the initiation of head-disk contact.

19 Claims, 5 Drawing Sheets

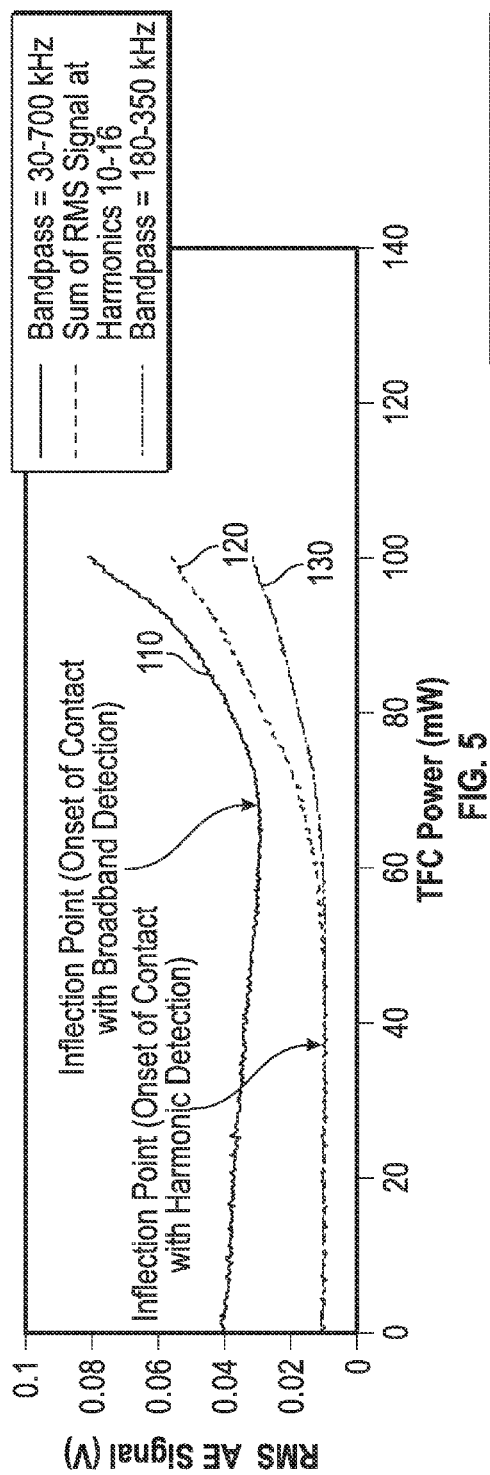
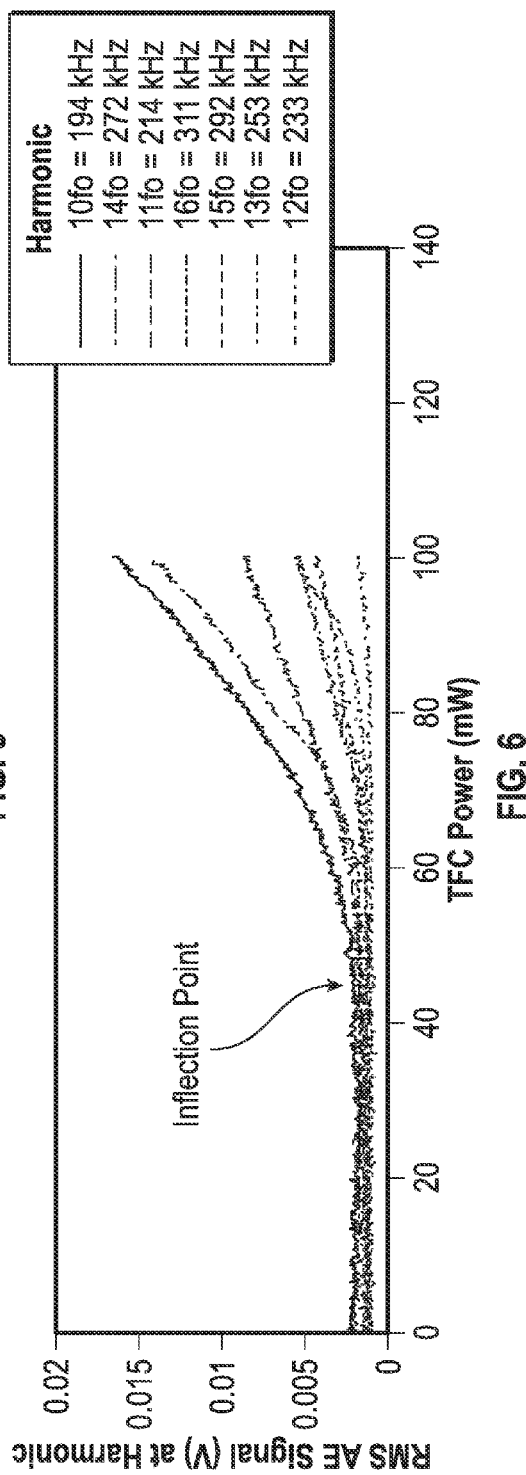

US 8,804,275 B1

SYSTEM AND METHOD FOR DETERMINING HEAD-DISK CONTACT IN A MAGNETIC RECORDING DISK DRIVE HAVING A FLY-HEIGHT ACTUATOR

BACKGROUND OF THE INVENTION

1. Field of the Invention

This invention relates to magnetic recording disk drives that have a fly-height actuator for controlling the spacing between the read/write head and the disk, and more particularly to a system and method for determining head-disk contact in such disk drives, including disk drives with bit-patterned media (BPM).

2. Description of the Related Art

Magnetic recording hard disk drives use a read/write transducer or head mounted on a head carrier for reading and/or writing data to the disk. The head carrier is typically an air-bearing slider attached to an actuator arm by a suspension and positioned very close to the disk surface by the suspension. There is typically a stack of disks in the disk drive with a slider-suspension assembly associated with each disk surface in the stack.

The separation or spacing between the head and the disk surface is called the fly height. The slider has a disk-facing air-bearing surface (ABS) that causes the slider to ride on a cushion or bearing of air generated by rotation of the disk. The slider is attached to a flexure on the suspension and the suspension includes a load beam that applies a load force to the slider to counteract the air-bearing force while permitting the slider to "pitch" and "roll". The flying dynamics of the slider and thus the fly height are influenced by factors such as the rotation speed of the disk, the aerodynamic shape of the slider's ABS, the load force applied to the slider by the suspension, and the pitch and roll torques applied to the slider by the suspension.

Disk drives have been proposed that use a fly-height actuator for changing the spacing between the head and the disk surface. One type of fly-height actuator is a thermal actuator with an electrically-resistive heater located on the slider near the head. When current is applied to the heater the heater expands and causes the head to "protrude" and thus move closer to the disk surface. Other fly-height actuators for moving the head relative to the slider include electrostatic microactuators and piezoelectric actuators. Another type of fly-height actuator, also based on thermal, electrostatic or piezoelectric techniques, changes the head-disk spacing by altering the air-flow or the shape of the slider's ABS.

The fly-height actuator must be accurately calibrated so that the head-disk spacing can be controlled. The calibration requires that the value of the control signal that results in onset of head-disk contact (HDC) be known. If the fly-height actuator is a thermal actuator with an electrically-resistive heater located on the slider near the head, this control signal value is the value of heater power that results in HDC.

SUMMARY OF THE INVENTION

Embodiments of the invention relate to a system and method for determining head-disk contact so that the fly-height actuator can be properly calibrated so as to enable accurate control of head-disk spacing. The disk surface includes generally equally angularly spaced regions that have a topography different from the other regions of the disk. In one embodiment of a bit-patterned media (BPM) disk, equally angularly spaced servo sectors have a topography different from the data regions of the disk. A head-disk spacing sensor detects the topography of the servo sectors as the servo sectors pass the sensor during rotation of the disk. This results in the head-disk spacing sensor generating an output signal with a fundamental frequency $f_0 = NX/60$ Hz, where N is the number of servo sectors equally angularly spaced around the disk and X is the disk rotation rate in RPM.

In embodiments of this invention, at least one of the second and higher harmonics of the fundamental frequency $f_0$ are filtered from the output of the head-disk spacing sensor and used to identify the initiation of head-disk contact. An inflection point in the filtered signal or signals, typically approximately the minimum value, is identified as the filtered signal value corresponding to head-disk contact. This inflection point value is then correlated with the value of the signal sent to the fly-height actuator that resulted in the detected head-disk contact.

For a fuller understanding of the nature and advantages of the invention, reference should be made to the following detailed description taken together with the accompanying figures.

BRIEF DESCRIPTION OF THE DRAWING

FIG. 5, which is a graph of a PZT transducer acoustic emission (AE) sensor output (in rms volts) as a function of thermal fly-height control (TFC) heater power, at various frequencies, including the broadband frequency range used in the prior art.

FIG. 6 is a graph of the AE sensor output signals collected with narrow bandpass filters centered at each of the $10^{th}$ through $16^{th}$ harmonics of the fundamental frequency $f_0$.

DETAILED DESCRIPTION OF THE INVENTION

The invention is applicable to disk drives with head fly-height actuators that move the read-write head relative to the slider or alter the air-flow or shape of the slider's air-bearing surface (ABS) to control the head-disk spacing. The invention is applicable not only to magnetic recording disk drives, but also to head-disk testers or "spin stands" that are used in disk drive manufacturing to design and test the head-disk interface in magnetic recording disk drives.

Figure 1:
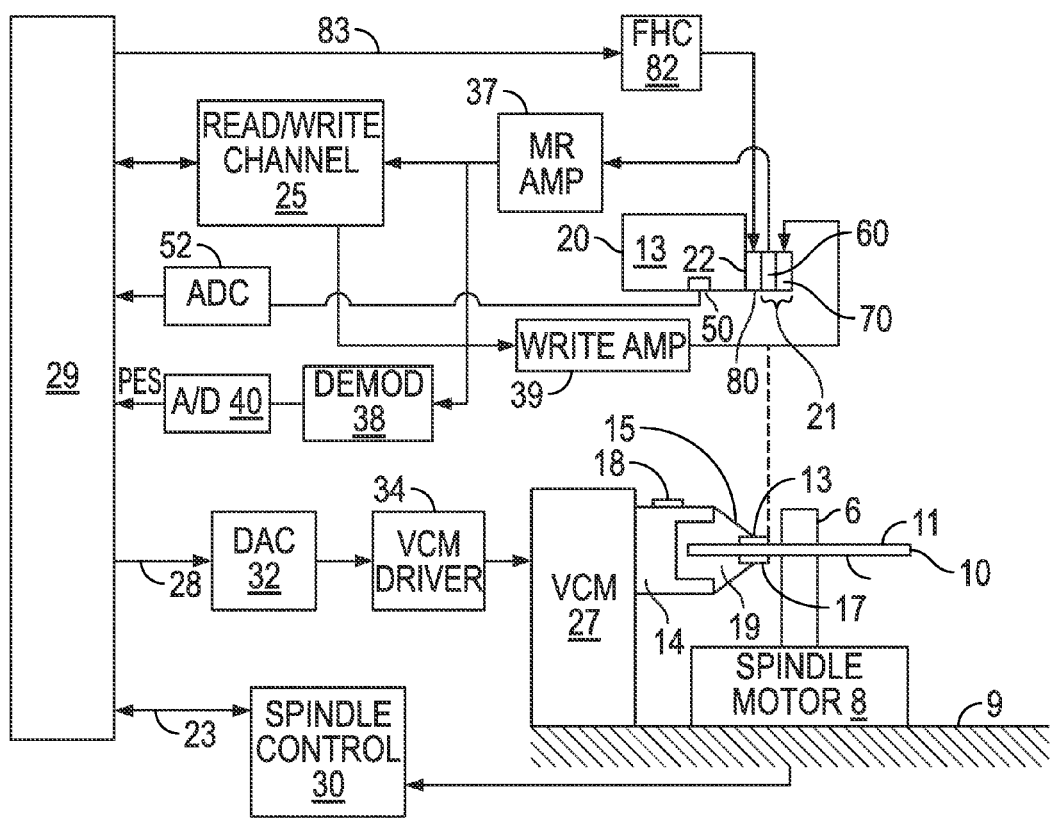
FIG. 1 is a schematic block diagram of a magnetic recording disk drive according to embodiments of the invention.

FIG. 1 is a schematic block diagram of a magnetic recording disk drive according to embodiments of the invention. The disk drive includes a magnetic recording disk 10 with surfaces 11 and 12, each of which contains a magnetic recording layer. The disk 10 may be a disk with a conventional continuous magnetic recording layer on each surface 11, 12, or a bit-patterned media (BPM) disk wherein the magnetic recording layer is formed as discrete magnetic islands or dots, with each dot being capable of being magnetized independently to represent an individual data bit. The disk 10 is mounted on a spindle 6 and rotated by a spindle motor 8 about an axis perpendicular to the disk surfaces 11, 12. A head carrier or slider 13 is positioned near the surface 11 of disk 10. Slider 13 is an air-bearing slider having an air-bearing surface (ABS) 20 facing toward the disk surface 11 and a trailing end 22. Slider 13 supports a read/write transducer or head 21 on its trailing end 22 for reading and writing data to the magnetic media on disk surface 11. The head 21 is a dual-element head having an inductive write element or head 70 and a magnetoresistive (MR) read element or head 60. Slider 13 is attached to an actuator arm 14 by means of a suspension 15. The suspension 15 provides a spring force that biases the slider 13 toward the disk surface 11. A second head carrier or slider 17, also supporting a read/write head, is positioned on surface 12 of disk 10 and is attached to actuator arm 14 by means of suspension 19.

Actuator arm 14 is attached to a rotary actuator 27. The actuator is typically a rotary voice coil motor (VCM) that comprises a coil movable within a fixed magnetic field, the direction and velocity of the coil movements being controlled by motor current signals supplied by a hard-disk controller 29. As the disk 10 rotates, the rotary actuator 27 moves the sliders 13, 17 in a generally arcuate path radially in and out over their respective disk surfaces 11, 12 so that the read/write heads may access different portions of the magnetic recording layers where data is desired to be read or recorded. Both the actuator 27 and spindle motor 8 are mounted to a portion of the disk drive housing 9.

Figure 2:
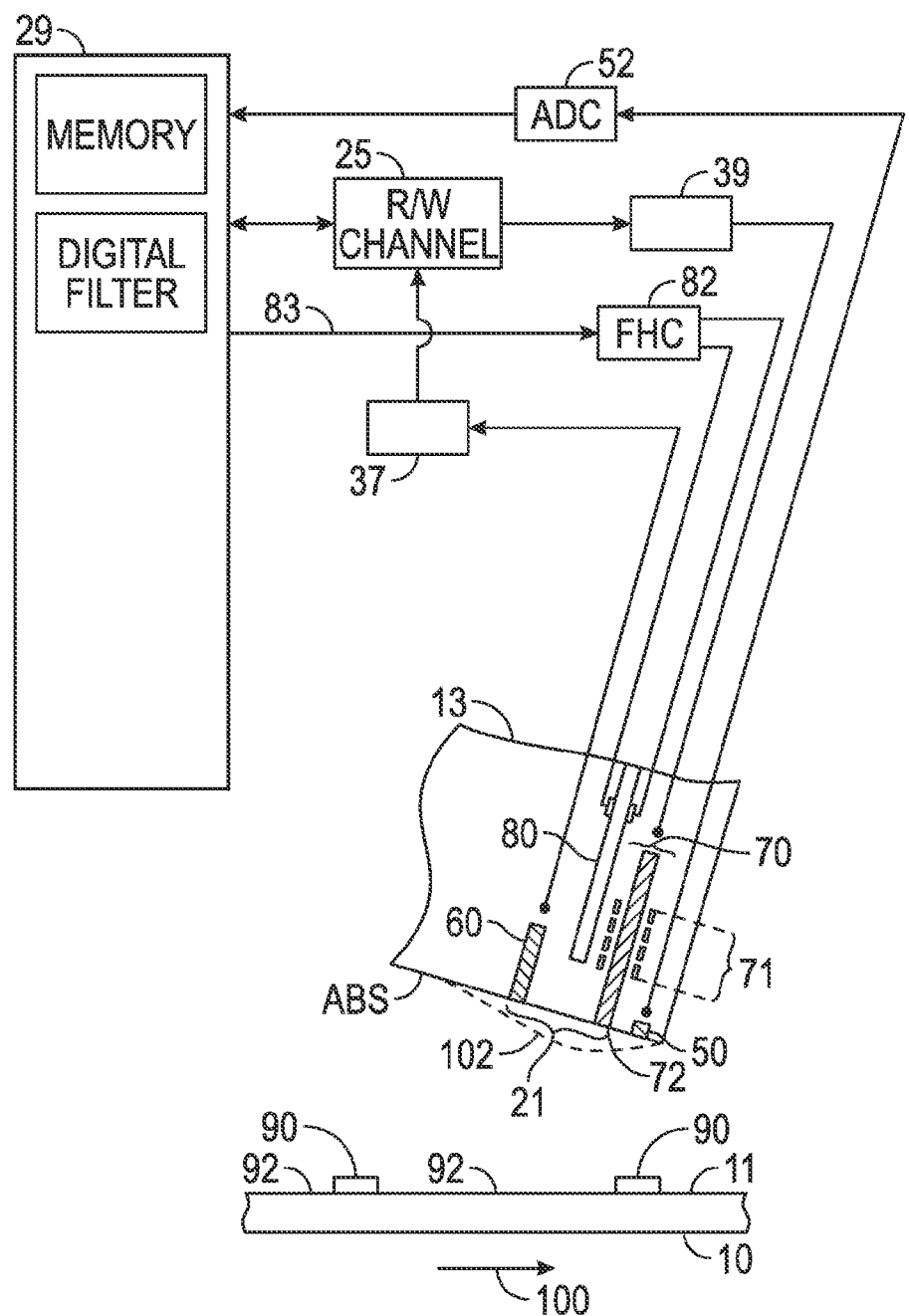
FIG. 2 is a sectional view of the end portion of an air-bearing slider above the surface of a disk and illustrates a thermal fly-height actuator, a read head and a write head on the slider, and a head-disk spacing sensor on the slider according to embodiments of the invention.

FIG. 2 is a sectional view of the end portion of slider 13 above the surface 11 of disk 10 according to embodiments of the invention. The rotation of the disk 10 in the direction of arrow 100 generates an air bearing between the ABS of slider 13 and disk surface 11. During operation of the disk drive, the air bearing counterbalances the slight spring force of the suspension and supports the slider 13 off and slightly away from the disk surface 11 by a small, substantially constant spacing. FIG. 2 also shows the read/write head 21, i.e., a MR read head 60 and write head 70. Write head 70 is depicted as an inductive write head with a helical coil 71 wrapped around a write pole 72. The inductive write head may also be a "pancake" type head with the coil located between the two write poles.

The slider 13 also includes a fly-height actuator for changing the spacing between read/write head 21 and the disk surface 11. The type of fly-height actuator shown in FIG. 2 is a thermal actuator with an electrically-resistive heating element or heater 80 electrically connected to and controlled by a fly-height controller (FHC) 82. FHC 82 is a power source that controls the amount of current to the heater 80, such as by controlling the settings of a variable resistor. As the current increases, the heater 80 expands and causes protrusion (PTR) of the head 21, as shown by the dashed line 102, which moves the MR read head 60 and pole tip 72 of write head 70 closer to disk surface 11. The FHC 82 may include a temperature feedback control circuit that monitors the temperature of the heater 80 to maintain the fly height of the head within a desired range during operation of the disk drive. A thermal fly-height actuator is described in U.S. Pat. No. 5,991,113 and published patent application US 2005/0024775 A1. Other fly-height actuators for moving the head relative to the slider include electrostatic microactuators, such as described in U.S. Pat. No. 6,611,399 B1, and piezoelectric actuators, such as described in U.S. Pat. No. 6,570,730 B1. Another type of fly-height actuator changes the head-disk spacing by altering the air-flow or the shape of the slider's ABS. This type of fly-height actuator includes thermal actuators, such as described in U.S. Pat. No. 6,775,103 B2, electrostatic actuators, such as described in U.S. Pat. Nos. 5,276,573 and 6,344,949, and piezoelectric actuators, such as described in U.S. Pat. No. 5,021,906.

The system shown in FIGS. 1 and 2 also includes a head-disk spacing sensor 50, which is depicted as a thermal embedded contact sensor (ECS) on the slider 13. A thermal ECS functions as a variable resistor in a circuit that provides a varying voltage output as changes in head-disk spacing cause changes in heating of the sensor. A thermal ECS is described in U.S. Pat. No. 8,618,793 B2 and U.S. Pat. No. 8,335,053 B2, both assigned to the same assignee as this application. The voltage output of sensor 50 is digitized by analog-to-digital converter (ADC) 52, with the digital output signal being sent to controller 29. The head-disk spacing sensor 50 may also be a PZT transducer acoustic emission (AE) sensor, as is well-known in head-disk testers. The AE sensor may be located on the actuator arm 14 (FIG. 1). In another embodiment of the invention the MR read head 60 may function as the head-disk spacing sensor.

Referring again to FIG. 1, the various components of the disk drive are controlled by control signals generated by the controller 29. Controller 29 is a digital signal processor that includes logic control circuits, memory storage, and a microprocessor. Controller 29 generates control signals for the various drive operations, such as control signals on line 23 to spindle motor controller 30, track following and track seek control signals on line 28 for actuator 27, and control signals on line 83 to FHC 82.

The MR read head 60 reads data from disk surface 11. Amplifier 37 amplifies the MR signal. The amplifier 37 and other read signal processing circuitry, as well as the circuitry for generating the sense or bias current to the MR read head 60, are typically part of an integrated circuit module 18 (FIG. 1) located on actuator arm 14. The module 18 is placed close to the read/write head 21 to keep the interconnections as short as possible, and is thus called the arm electronics module. The output from MR amplifier 37 is sent to the read/write (R/W) channel 25 where the analog signal from the MR read head 60 is processed into digital signals representing data recorded on the magnetic recording layer of disk surface 11. R/W channel 25 typically includes circuitry for automatic gain control, analog-to-digital conversion, and digital data detection. Data is written to the magnetic recording layer of disk surface 11 by write signals sent through R/W channel 25 and write amplifier 39 to inductive write head 70. Write amplifier 39 is typically located in arm electronics module 18.

The track following and seek control signals on line 28 are generated by controller 29 that runs a servo control algorithm in response to input head position error signals (PES). The MR read head 60 reads head position servo information recorded on the disk, typically at equally angularly spaced servo sectors embedded between the data sectors. This analog servo output from MR amplifier 37 is demodulated by demodulator 38 and converted to a digital position error signal (PES) by analog-to-digital (A/D) converter 40. The track following and seek control signals on line 28 are sent to digital-to-analog converter (DAC) 32 that converts them to analog voltage signals which are output to VCM driver 34. VCM driver 34 then sends corresponding current pulses to the coil of VCM actuator 27 to pivot the arm 14 radially inward and outward to move and position the sliders 13, 17 to the desired data tracks on the respective disk surfaces 11, 12.

Figure 3:
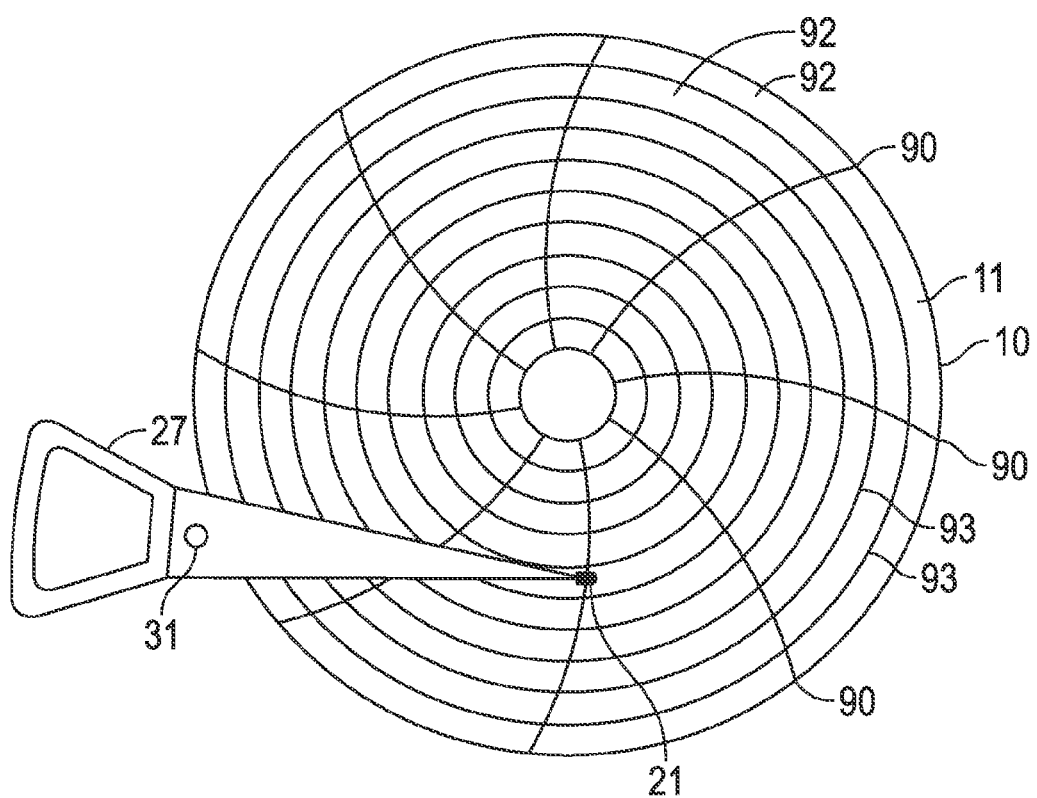
FIG. 3 is a plan view of a disk, which may be a bit-patterned media (BPM) disk, with generally equally angularly spaced servo sectors extending generally radially across the disk according to embodiments of the invention.

Embodiments of this invention relate to a system and method for determining head-disk contact so that the fly-height actuator 80 can be properly calibrated so as to enable accurate control of head-disk spacing, primarily the spacing between the write pole tip 72 and the surface 11 of disk 10. As shown in FIG. 2, the disk surface 11 includes equally angularly spaced servo sectors 90 that have topography different from the data regions 92 (the non-servo sector regions). The topography of the servo sectors 90 is detected by the head-disk spacing sensor 50 as the servo sectors pass the sensor during rotation of the disk 10 in the direction of arrow 100. FIG. 3 is a plan view of disk 10 with only a few representative servo sectors 90 that extend generally radially across representative data tracks 93 that contain the data regions 92. The servo sectors 90 have a generally arcuate shape that replicates the path of the read/write head 21 as it moves generally radially across the disk surface 11 when the rotary actuator 27 pivots about axis 31.

Figure 4:
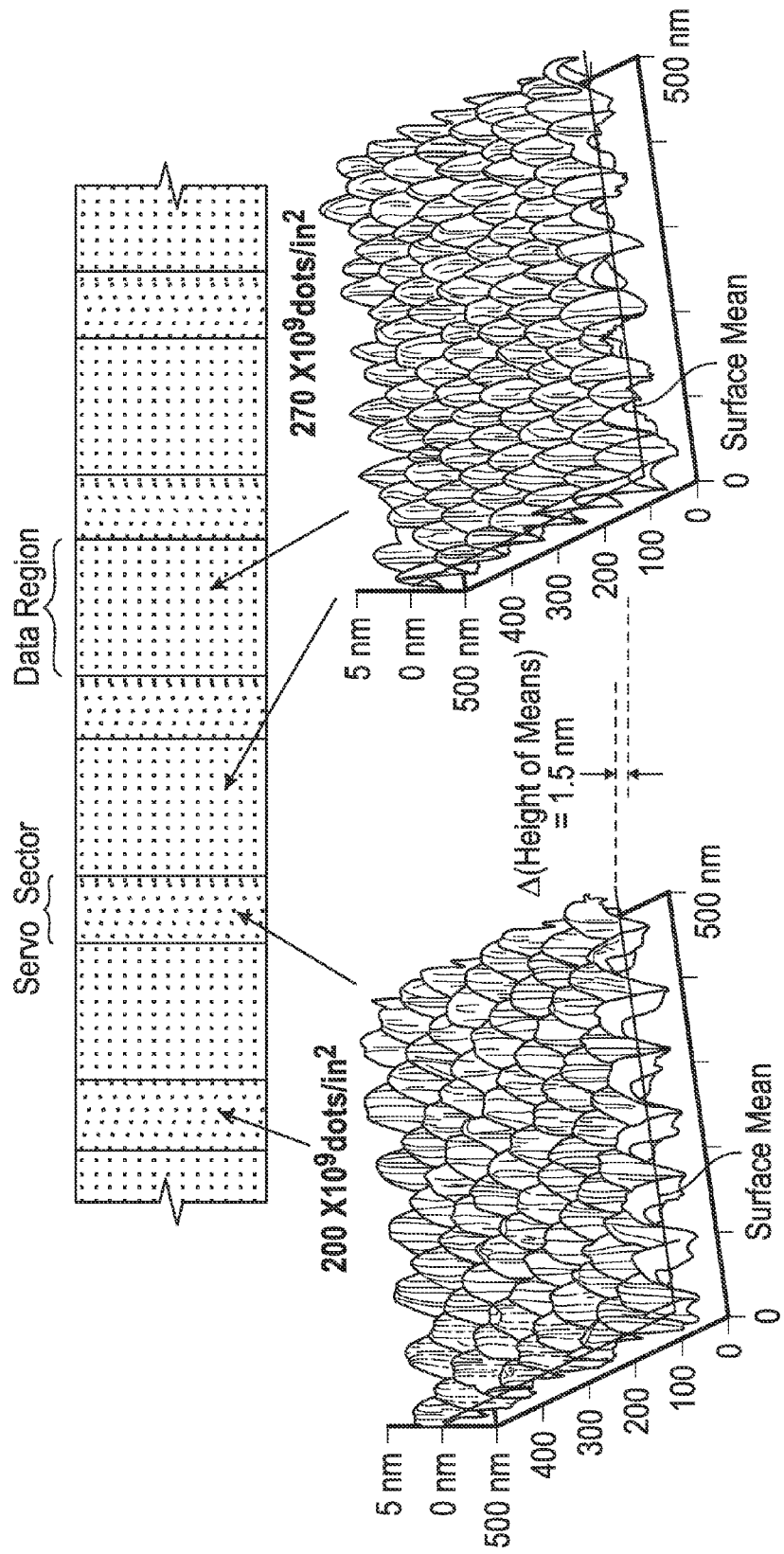
FIG. 4 are atomic force microscopy (AFM) perspective views comparing a portion of a servo sector of a BPM disk (left image) with a portion of a data region of a BPM disk (right image) and illustrate the difference in topography.

In one embodiment the disk 10 is a BPM disk wherein the servo sectors 90 inherently have a topography different from the topography in the data regions 92. This is a result of the servo sectors 90 being formed by a different method than the data regions 92 or having a different pattern or differing number and/or size of discrete islands. FIG. 4 are atomic force microscopy (AFM) perspective views comparing a portion of a servo sector of a BPM disk (left image) with a portion of a data region of a BPM disk (right image) and illustrate the difference in topography. The servo sectors 90 have a dot density of about $200 \times 10^9$ dots/in$^2$ compared to about $270 \times 10^9$ dots/in$^2$ for the data regions and a mean height about 1.5 nm greater than the data regions. As a result of this difference in topography, during rotation of the disk 10, as the fly-height actuator 80 moves the head closer to the disk surface 11, the head-disk spacing sensor 50 (FIG. 2) will detect the servo sectors 90 as a result of a difference in the friction force. The servo sectors will be detected at a fundamental frequency $f_0$=NX/60 Hz, where N is the number of servo sectors generally equally angularly spaced around the disk and X is the disk rotation rate in RPM. Thus for example if there are 240 servo sectors and the disk rotates at 10,000 RPM, $f_0$=40 kHz. The invention is not limited to the use of servo sectors as the topographic regions nor to only BPM disks, but is fully applicable to any disk having a plurality of generally equally angularly spaced topographic regions that will result in the head-disk spacing sensor providing an output signal at a fundamental frequency $f_0$. The topographic regions can be higher or lower than the surrounding regions to result in a modulation of the friction force that is detectable by the head-disk spacing sensor.

In embodiments of this invention, at least one of the second and higher harmonics of the fundamental frequency $f_0$ are filtered from the output of the head-disk spacing sensor and used to identify the initiation of head-disk contact. It has been discovered, that as the fly-height actuator moves the head toward the disk, the second and higher harmonic frequencies of $f_0$ provide a much more accurate determination of head-disk contact than the prior art technique of broadband frequency detection. This is illustrated in FIG. 5, which is a graph of a PZT transducer acoustic emissions (AE) sensor output (in RMS volts) as a function of thermal fly-height control (TFC) heater power, at various frequencies, including the broadband frequency range used in the prior art. FIG. 5 is for a BPM disk that has data regions with $270 \times 10^9$ dots/in$^2$ and 216 servo sectors with $200 \times 10^9$ dots/in$^2$ regularly spaced around the disk, with the disk having a rotational speed of 5400 RPM ($f_0$=19.44 kHz). The rise in AE signal can be used to detect the onset of head-disk contact during the TFC protrusion of the head into contact with the BPM disk. Curve 110 is the broadband detection of the AE signal vs. TFC power, which is collected over the entire frequency range where air bearing resonances can be excited, typically 30-700 kHz, and is the frequency range used in the prior art to determine initiation of head-disk contact by AE sensors in head-disk testers. Curve 110, the AE signal processed with a broadband filter (30-700 kHz) typically used for head-disk contact detection, has high background signal when the head is not protruded into contact. This high background signal comes from the broadband excitation of the air bearing resonances from the airflow around the slider and from disk micro-waviness. Curve 110 shows an inflection point, where the AE signal is approximately at a minimum and then begins to rise, at TFC power of about 62 mW. Curve 120 is the sum of the signals from the 10$^{th}$ through 16$^{th}$ harmonics of $f_0$. Curve 130 is the AE signal collected with a broadband pass filter with a frequency range slightly wider than 10$f_0$ through 16$f_0$. FIG. 5 shows that filtering the AE signal to provide a sum of the higher harmonics (curve 120) or a range of multiple higher harmonics (curve 130) results in an inflection point at TFC power of about 42 mW, thus indicating that head-disk contact is occurring earlier than predicted by the prior art technique.

FIG. 6 is a graph of the AE sensor output signals collected with narrow bandpass filters centered at each of the 10$^{th}$ through 16$^{th}$ harmonics. The bandwidth of each of these bandpass filters is 1% of the associated harmonic frequency. Using a narrow bandpass filter centered about the individual harmonics with frequencies above the air bearing resonances frequencies suppresses the magnitude of the AE background to <1% of the original broadband background signal. From FIG. 6, the best signal strength and signal-to-noise ratio (SNR) while the head is in contact is obtained by monitoring the 10$^{th}$ harmonic of $f_0$ (10$f_0$=194 kHz). At this harmonic, the signal increases, from the initial background at TFC power=0 mW, to 8 times this value at TFC power=100 mW, compared to a factor of only 2 increase for the original broadband signal (curve 110 in FIG. 5). Also, the initial rise in AE signal is observed to occur at a TFC power of about 42 mW, rather than at about 62 mW for the original broadband signal, where this rise for TFC power<62 mW is obscured by the high AE background from the lower frequency contributions. So, in this particular example, the method of contact detection according to embodiments of this invention is able to detect contact at 20 mW lower TFC power, indicating that 2 nm of contact interference is already occurring by the time that the prior art broadband detection scheme would register the onset of contact.

While the graphs of FIGS. 5 and 6 are for a PZT transducer AE sensor as the head-disk spacing sensor, similar curves would result for a thermal ECS sensor or for the MR read head functioning as the head-disk spacing sensor. In embodiments of this invention, as shown in FIG. 2, the output of the head-disk spacing sensor 50 is digitized by ADC 52, with the digitized signal being sent to digital signal processor 29. Digital signal processor 29 performs digital filtering to provide the second and higher harmonic frequencies of $f_0$. The digital signal processor 29 may filter only one of the harmonics, for example the 10$^{th}$ harmonic in the above example, a sum of different second and higher harmonics, or a range of multiple higher harmonics. Then, after calculating the series of digital values representing the harmonics, an inflection point in the filtered signal or signals, typically approximately the minimum value, is identified. This inflection point value is then correlated with the value of the signal sent to the FHC 82 that resulted in the detected head-disk contact. This value of the FHC signal is the heater power value resulting in head-disk contact (Hp(HDC) and may be stored in memory. The filtering of the head-disk spacing sensor output signal to provide the desired harmonic or sum or range of multiple harmonics can also be performed by conventional analog filtering circuitry.

The value of Hp(HDC) can be used to calibrate the fly-height actuator, i.e., to determine the relationship between head-disk spacing d and the heater power required to achieve spacing d (Hp(d)). This is given by the following relationship:

$$d=(\rho)[Hp(HDC)-Hp(d)] \quad \text{Equation (1)}$$

The value ρ is the sensitivity of head-disk spacing to heater power (Hp) expressed as follows:

$$\rho=\Delta d/\Delta Hp \quad \text{Equation (2)}$$

There are well-known techniques for determining ρ from the read-back signal, including the pulse-width method and the harmonic ratio fly-height (HRF) method. The pulse-width method relies on changes in pulse width at 50% amplitude (PW50) with changes in magnetic spacing. Another method relies on the well-known Wallace spacing loss relationship and is described in U.S. Pat. No. 7,180,692 B1, which is assigned to the same assignee as this application. The pulse-width method and the method described in the '692 patent are described in detail by Nikitin, et al. "Spatial and temporal profiling of protrusion in magnetic recording heads", *IEEE Transactions on Magnetics*, Vol. 40, No. 1, January 2004, pp. 326-331. The HRF method calculates the ratio of the fundamental amplitude to the third harmonic amplitude of the read-back signal, and is described in detail in U.S. Pat. No. 5,130,866.

The operation of embodiments of this invention as described above may be implemented as a set of computer program instructions stored in machine-readable memory and executable by a processor, such as the digital signal processor 29, or by a controller or dedicated microprocessor. The computer program instructions include signaling the fly-height actuator to move the read/write head toward the disk as the disk is rotating, digitally filtering the spacing sensor output signal to pass at least one of the second and higher harmonic frequencies, identifying an inflection point in the filtered harmonic frequencies, and recording the fly-height actuator control signal corresponding to said inflection point as the fly-height control signal head-disk contact (HDC) value. The processor is configured to read and execute the program instructions. The processor or controller may perform logical and arithmetic operations based on program instructions stored in memory, and/or the functions of the method described above may be performed by hardware.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for determining head-disk contact in a magnetic recording disk drive having a rotatable magnetic recording disk having a plurality of generally equally angularly spaced topographic regions extending across the disk, an air-bearing slider maintained near the surface of the rotating disk, a write head on the slider, a head-disk spacing sensor, a head fly-height actuator for changing the head-disk spacing, and a fly-height controller connected to the fly-height actuator, the method comprising:

signaling the fly-height actuator to move the write head toward the disk as the disk is rotating;
   detecting an output signal from the spacing sensor at a fundamental frequency corresponding to the frequency of topographic regions detected by the spacing sensor;
   filtering the spacing sensor output signal to detect at least one of the second and higher harmonic frequencies;
   identifying an inflection point in the detected at least one harmonic frequency; and
   recording the fly-height actuator control signal corresponding to said inflection point value as the fly-height control signal head-disk contact (HDC) value.

2. The method of claim 1 wherein filtering the spacing sensor output signal comprises summing a multiple of detected harmonic frequencies, and wherein identifying an inflection point comprises identifying an inflection point in the signal representing said summed harmonic frequencies.

3. The method of claim 1 wherein filtering the spacing sensor output signal comprises filtering over a range of harmonic frequencies, and wherein identifying an inflection point comprises identifying an inflection point in the signal representing said range of harmonic frequencies.

4. The method of claim 1 wherein the fly-height actuator is a thermal fly-height actuator, wherein signaling the fly-height actuator to move the write head toward the disk comprises applying heater power values (Hp) to the thermal actuator, and wherein recording the fly-height actuator control signal comprises recording the Hp corresponding to head-disk contact (Hp(HDC)).

5. The method of claim 1 wherein the spacing sensor is a thermal sensor on the slider.

6. The method of claim 1 wherein the spacing sensor is a PZT transducer for detecting acoustic emissions.

7. The method of claim 1 wherein the spacing sensor is a magnetoresistive read head on the slider.

8. The method of claim 1 wherein the disk drive includes a digital signal processor and an analog-to-digital converter (ADC) between the spacing sensor and the signal processor, and wherein filtering the spacing sensor output signal comprises digitally filtering said spacing sensor output signal.

9. A system for detecting head-disk contact in a magnetic recording disk drive having a fly-height actuator comprising:

a rotatable magnetic recording disk having a plurality of generally equally angularly spaced topographic regions extending across the disk;
   an air-bearing slider maintained near the surface of the disk when the disk is rotating;
   a read/write head on the slider;
   a head-disk spacing sensor responsive to changes in spacing between the slider and the disk and capable of providing an output signal at a frequency corresponding to the frequency of topographic regions when the disk is rotating;
   a harmonic frequency detector for detecting, from the head-disk spacing sensor output signal, at least one of the second and higher harmonic frequencies of topographic regions when the disk is rotating;
   a fly-height actuator for changing the spacing between the read/write head and the disk; and
   a digital processor configured to signal the fly-height actuator to move the read/write head toward the disk as the disk is rotating, process the signal from the harmonic frequency detector, identify an inflection point of the signal from the harmonic frequency detector, and record the fly-height actuator control signal corresponding to said inflection point as the fly-height control signal head-disk contact (HDC) value.

10. The system of claim 9 wherein the head-disk spacing sensor comprises a thermal sensor on the slider.

11. The system of claim 9 wherein the read/write head includes a magnetoresistive read head and wherein said read head is said head-disk spacing sensor.

12. The system of claim 9 wherein the head-disk spacing sensor comprises a PZT transducer for detecting acoustic emissions.

13. The system of claim 9 wherein the harmonic frequency detector comprises a filter for passing said harmonic frequency.

14. The system of claim 9 wherein the harmonic frequency detector comprises multiple filters for passing multiple harmonic frequencies.

15. The system of claim 9 wherein the harmonic frequency detector comprises an analog-to-digital converter for digitizing the head-disk contact sensor output signal, and wherein said digital signal processor comprises a digital filter that detects at least one of the second and higher harmonic frequencies from the digitized head-disk contact sensor output signal.

16. The system of claim 9 wherein the fly-height actuator is a thermal actuator comprising a heater located on the slider, and wherein the recorded fly-height actuator control signal HDC value is representative of heater power Hp(HDC) that results in head-disk contact.

17. The system of claim 9 wherein the system is a head/disk tester.

18. The system of claim 9 wherein the system is a magnetic recording disk drive.

19. A magnetic recording disk drive comprising:
a rotatable bit-patterned media (BPM) magnetic recording disk having a plurality of generally equally angularly spaced servo sectors extending generally radially across the disk, the servo sectors having a topography different from the topography of non-servo sector regions of the disk;
an air-bearing slider maintained near the surface of the disk when the disk is rotating;
a read/write head on the slider;
a thermal head-disk spacing sensor on the slider responsive to changes in spacing between the head and the disk and capable of providing an output signal at a frequency corresponding to the frequency of servo sectors when the disk is rotating;
an analog-to-digital converter (ADC) for digitizing the spacing sensor output signal;
a thermal fly-height actuator on the slider for changing the spacing between the read/write head and the disk;
machine-readable memory containing a program of instructions; and
a digital processor capable of reading and executing the program of instructions, the processor being configured to signal the fly-height actuator to move the read/write head toward the disk as the disk is rotating, digitally filter the digitized spacing sensor output signal to pass at least one of the second and higher harmonic frequencies, identify an inflection point in the filtered at least one of the second and higher harmonic frequencies, and record the fly-height actuator control signal corresponding to said identified inflection point as the fly-height control signal head-disk contact (HDC) value.

* * * * *